(12) United States Patent
Fuhlbrigge et al.

(10) Patent No.: US 8,798,787 B2
(45) Date of Patent: Aug. 5, 2014

(54) ULTRA-FLEXIBLE PRODUCTION MANUFACTURING

(71) Applicant: ABB Research Ltd., Zurich (CH)

(72) Inventors: Thomas A. Fuhlbrigge, Ellington, CT (US); Jeremy Newkirk, West Hartford, CT (US); Carlos Martinez, South Windsor, CT (US); George Q. Zhang, Windsor, CT (US); Gregory F. Rossano, Enfield, CT (US); Harald Staab, Windsor, CT (US); Remus Boca, Simsbury, CT (US); Sangeun Choi, Simsbury, CT (US); Soenke Kock, Schriesheim (DE); William John Eakins, Bloomfield, CT (US)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/069,465

(22) Filed: Dec. 9, 2013

(65) Prior Publication Data

US 2014/0121828 A1    May 1, 2014

Related U.S. Application Data

(63) Continuation of application No. PCT/US2013/054243, filed on Aug. 9, 2013.

(60) Provisional application No. 61/681,254, filed on Aug. 9, 2012.

(51) Int. Cl.
*G06F 7/00* (2006.01)
*G05B 19/418* (2006.01)
*G05D 1/02* (2006.01)
*B25J 5/00* (2006.01)

(52) U.S. Cl.
CPC ............. *B25J 5/00* (2013.01); *G05B 19/41895* (2013.01); *G05D 2201/0216* (2013.01); *G05D 1/0297* (2013.01); *G05B 2219/31013* (2013.01);
*Y10S 901/01* (2013.01); *G05B 2219/31003* (2013.01); *G05B 2219/32388* (2013.01)
USPC ........... 700/228; 700/229; 700/230; 700/213; 901/1

(58) Field of Classification Search
None
See application file for complete search history.

(56) References Cited

U.S. PATENT DOCUMENTS 4,956,777 A     9/1990  Cearley et al.
5,363,310 A  *  11/1994  Haj-Ali-Ahmadi et al. .. 700/216
(Continued)

FOREIGN PATENT DOCUMENTS

DE         102010032876 A1     2/2012

OTHER PUBLICATIONS

Authorized Officer R. Orobitg Oriola, European Patent Office, International Search Report for International Application No. PCT/US2013/054243 With Written Opinion of the International Searching Authority having a mailing date of Nov. 6, 2013.

(Continued)

*Primary Examiner* — Yolanda Cumbess
(74) *Attorney, Agent, or Firm* — Michael M. Rickin

(57) ABSTRACT

A manufacturing system has one or more work cells that each performs one or more manufacturing processes. The system also has one or more mobile transport units ("MTUs") that deliver transportable containers containing workpieces to and from said work cells. The MTUs deliver the containers to the work cells in a manner such that the workpieces are localized in the work cells. The manufacturing system also has a computer system that has status information for each of the one or more MTUs and uses the status information to control each of the one or more MTUs to deliver the transportable containers to and from the one or more work cells.

28 Claims, 7 Drawing Sheets

(56) References Cited

U.S. PATENT DOCUMENTS

2008/0230349 A1* 9/2008 Moreira Guardao
  et al. .................... 198/463.3
2009/0185884 A1* 7/2009 Wurman et al. ............. 414/270
2011/0060449 A1* 3/2011 Wurman et al. ............. 700/218

OTHER PUBLICATIONS

Sen A et al: "The Supervisory System of the Imperial College Free Ranging Automated Guided Vehicle Project", Decision Aiding for Complex Systems. Charlottesville, VA, Oct. 13-16, 1991; Proceedings of the International Conference on Systems, Man and Cybernetics, New York, IEEE, US, vol. _, Oct. 13, 1991, pp. 1017-1022.

Interrante L D et al.: "Active Rescheduling for Automated Guided Vehicle Systems", Intelligent Systems Engineering, Institution of Electrical Engineers, Stevenage, GB, vol. 3, No. 2, Jun. 21, 1994, pp. 87-100.

Syed U et al: "Anticipatory real-time scheduling in manufacturing cell design", Systems, Man and Cybernetics, 1995. Intelligent Systems for the 21st Century, IEEE International Conference in Vancouver, BC, Canada, Oct. 22-25, 1995, New York, NY, USA, IEEE, US, vol. 5, Oct. 22, 1995, pp. 4131-4136.

* cited by examiner

ULTRA-FLEXIBLE PRODUCTION MANUFACTURING

FIELD OF THE INVENTION

This invention relates to a system of manufacturing using populations of standardized mobile transport units ("MTUs"), transportable containers (such as tables or bins) and various types of work cells to create a highly flexible manufacturing environment.

DESCRIPTION OF THE PRIOR ART

In a manufacturing environment work cells perform various processes, such as welding, assembly, machining, inspecting, etc. on parts and assemblies, also referred to herein as workpieces. The parts and assemblies must be delivered to the work cells and can also be moved between the work cells for further work or to non-work cell locations in the manufacturing environment during the process flow, which is the set of all processes performed on a workpiece and the order of those processes.

The conventional method for delivering workpieces within a manufacturing environment is to use a conveyor system. Conveyor systems are designed and constructed to transport workpieces between work cells in a specific order. Workpieces are typically mounted on a fixture that is capable of traveling along the conveyor sections and is accurately located within the work cells.

Conveyors are rigid structures that are secured to the floor. With conveyor systems, there is always wait time for a work cell as the previous workpiece moves out of the cell and a new workpiece is delivered to the cell. This results in a significant portion of time that the work cell is not in use. Bottlenecks are also created in a conveyor system due to variations in cycle times for the different work cells. The bottlenecks result in delays in the delivery of workpieces to the work cells.

SUMMARY OF THE INVENTION

A system of manufacturing has:

one or more work cells, where each of the cells performs one or more manufacturing processes on an associated one of one or more workpieces;

one or more mobile transport units ("MTUs") to deliver transportable containers containing the workpieces to and from the work cells, the one or more mobile transport units delivering the containers to the work cells independent of a fixed in place path between the one or more work cells and in a manner such that the workpieces are localized in the work cells; and a computer system having therein status information for each of the one or more MTUs and using the status information to control each of the one or more MTUs to deliver the transportable containers to and from the one or more work cells;

wherein when a determination is made that work performed at one of the one or more work cells on the associated workpiece is in error, the computer system commands the associated one of said one or more MTUs to deliver the transportable container with said workpiece on which the work was performed to one of a rework station or a disposal area.

DETAILED DESCRIPTION

As described in more detail below, a population of MTUs delivers transportable containers, containing workpieces to work cells for manufacturing processes. The transportable containers may be in the form of tables, bins, trays, pallets, etc. The population of MTUs also delivers workpieces whose manufacturing process has been completed at a work cell to either another work cell for another manufacturing process to be performed on the workpiece or to a non-work cell location in the manufacturing facility (e.g. a shipping or storage location). As should be appreciated the workpieces may also be delivered from a non-work cell location to a work cell. The term "work cell" as used herein includes, but is not limited to, robot cells, hard automation cells, manual cells and testing cells.

Figure 1:
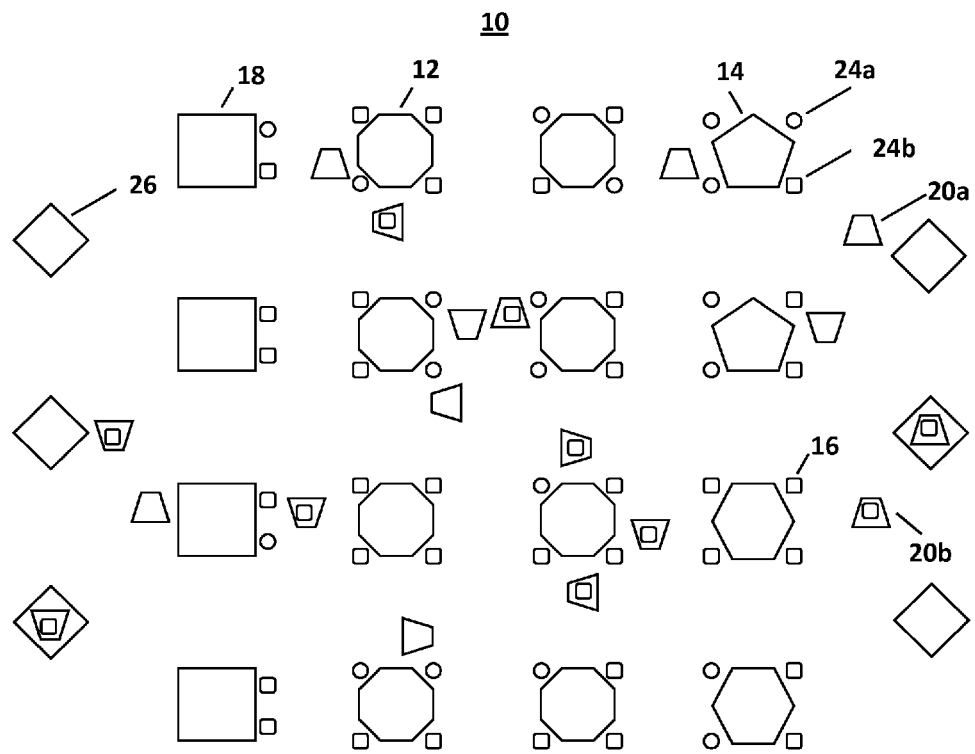
FIG. 1 shows an exemplary manufacturing environment consisting of work cells and associated container stations, MTUs and buffer stations.

Referring now to FIG. 1, there is shown a layout of work cells 12, 14, 16, 18 and associated container stations 24a, 24b, MTUs 20a, 20b and buffer stations 26 in an exemplary manufacturing environment 10. The work cells shown in FIG. 1 are robot work cells 12, hard automation work cells 14 which are equipment used for a specific production purpose, for example CNC machinery, testing cells 16, and manual work cells 18 at which humans perform the work. MTUs 20a proceed to a location to pick up a transportable container and MTUs 20b carry transportable containers to the desired locations. As is described below, in the case that the next work cell in the work flow is not prepared to receive a transportable container, buffer stations 26 temporarily hold in process work until the work cell is ready to receive the work. It should be noted that in FIG. 1 each of the different types of work cells 12, 14, 16 and 18 and associated container stations 24a, 24b, the two MTUs 20a, 20b and the buffer stations 26 not only have a unique reference numeral but also have a unique symbol.

Figure 5:
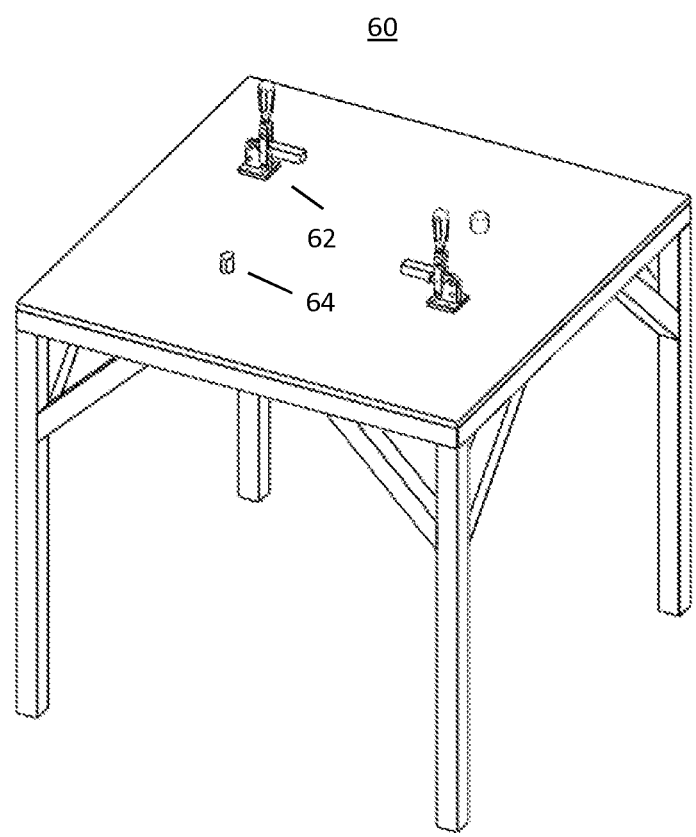
FIG. 5 shows one example of a transportable container.

Referring to FIG. 5, there is shown one example of a transportable container in the form of a table 60. Table 60 includes fixtures in the form of toggle clamps 62 for securing a workpiece to the table 60 and dowel pins 64 for locating the workpiece on the table. As is known by those skilled in the art, there are many other means of securing workpieces to the table. One or more workpieces could also be delivered in bins, trays, pallets, etc., rather than being secured to the container. In the case of workpieces not being secured to the container and as is known by those skilled in the art a vision system or other means of localization could be implemented to determine the position and/or orientation of the workpieces in the bin, tray, pallet, etc. The term "localization" or "localizing" or "localize" as used herein means determining in a work cell the position and/or orientation of a container and/or a workpiece with the determination for the workpiece being with or without determining the position and/or orientation of the container, bin etc. that holds or contains the workpiece.

Referring again to FIG. 1, each hard automation cell 14 may contain one or more pieces of machinery for performing varying manufacturing processes. The machinery may include, but is not limited to, machine tools (e.g. a CNC mill or lathe), automated presses or other standard machinery well known to someone skilled in the art.

The term "machinery" as used herein includes not only the machinery described above in hard automation cell 14 but also includes the robots described below in cell 12, and the equipment that is in the testing cell 16 and the manual cell 18.

As is well known, each robot work cell 12 also includes one or more robots. For example, the robot work cell 12 can have two robots one of which holds a workpiece to be worked on and the other of which holds a tool that either performs specific work on the workpiece or the tool may be adaptive or flexible so it can be used to perform several tasks on the workpiece. Each robot in the cell may for example be an industrial robot arm with multiple degrees of freedom. Examples of such robot arms include serial and parallel arm structures.

The robot work cell 12 may also include a tool changer such as for example the QC Series of tool changers which is one of the many tool changers available from ATI Industrial Automation. As is well known, the tool changer may be of the type that requires that the tool be manually changed or may be of the type that includes a tool magazine that permits the tools to be automatically changed.

Figure 2:
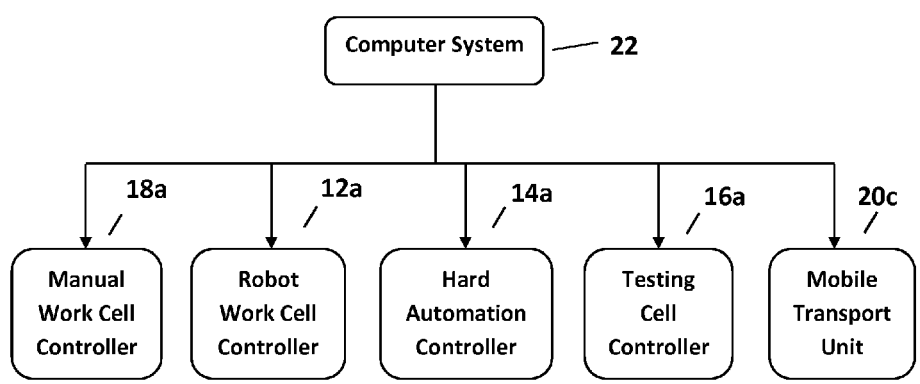
FIG. 2 shows a block diagram for the interconnection of a computer system and the controlling devices in each work cell.

As is shown in the block diagram of FIG. 2, each robot work cell 12 also includes an associated robot controller or other controlling device 12a. As is also shown in FIG. 2, each of the hard automation work cells 14, testing cells 16, manual work cells 18 and the MTUs 20a and 20b also include an associated controlling device 14a, 16a, 18a and 20c, respectively. A controlling device is a programmable device that executes a program and has the ability to communicate with other controlling devices or computer systems.

A computer system 22, also shown in FIG. 2, coordinates the interactions between the work cells 12, 14, 16 and 18 and the mobile transport units 20a and 20b by communicating with their respective controlling devices 12a, 14a, 16a, 18a and 20c. In particular, the MTUs 20a, 20b are called on demand (predictively) to retrieve, as does MTU 20a the transportable containers from either a storage area or a previous work cell, and to deliver the retrieved transportable container, as does MTU 20b to the next work cell or station. An on demand request is triggered by an event such as the completion of a process, a specified amount of time before or after the completion of a process, a process error, etc.

Each of the work cells 12, 14, 16 and 18 can, as shown in FIG. 1, have one or more container stations 24a and 24b. The container stations 24 are the locations in each of the work cells where transportable containers are located and can be worked on within the work cell. FIG. 1 shows an example at a given instant of time of the container stations 24a, 24b. The container stations 24b whose unique symbol in FIG. 1 is a square are the container stations which at that instant of time have transportable containers and the container stations 24a whose unique symbol is a circle are the container stations which are empty at that instant of time. Multiple container stations 24 in each work cell allows the work cell to begin work on a not yet worked on workpiece immediately after the work cell has completed its work on a workpiece on another transportable container in the work cell. Thus multiple container stations 24 in each work cell will optimally keep the work cells running at nearly 100% usage.

Figure 6:
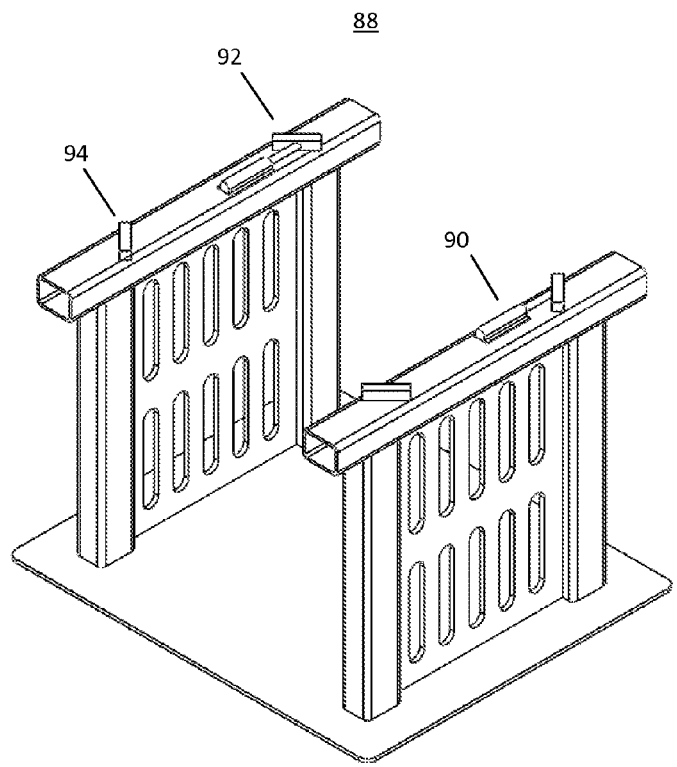
FIG. 6 shows one example of a docking station.

Each work cell may have a method of localizing the transportable containers using a mechanical or sensor based approach. Referring to FIG. 6, there is shown an embodiment of a mechanical based localizing method in the form of a docking station 88, which may be used in the container stations 24 to accurately and securely localize transportable containers into specified locations. In this embodiment, the docking station 88 has two linear actuators 90 with attached clamps 92 and two stationary clamps 94.

For this embodiment a transportable table has cross members in the corners on the top of the frame for the clamps to engage when the linear actuators are actuated. The two clamps on the linear actuators push on the cross members sliding the table along the top of the docking station 88 until the stationary clamps 94 engage the remaining cross members, accurately securing the table into a known position and orientation within the work cell. This engagement method allows for a MTU to place a table close to its final position without having to be overly accurate, which may be difficult for a MTU. Those skilled in the art could implement other docking station designs.

In another embodiment, as is known by those skilled in the art, a sensor based method could be implemented to localize the transportable containers within the work cells. This sensor based method could use vision or position sensors (e.g. proximity sensors) or any other sensor technology known by those skilled in the art. It should also be appreciated that a combination of mechanical and sensor based technology could be used to localize the containers and/or workpieces. As is mentioned above the workpieces can be localized directly without localizing the transportable container.

Figure 3A:
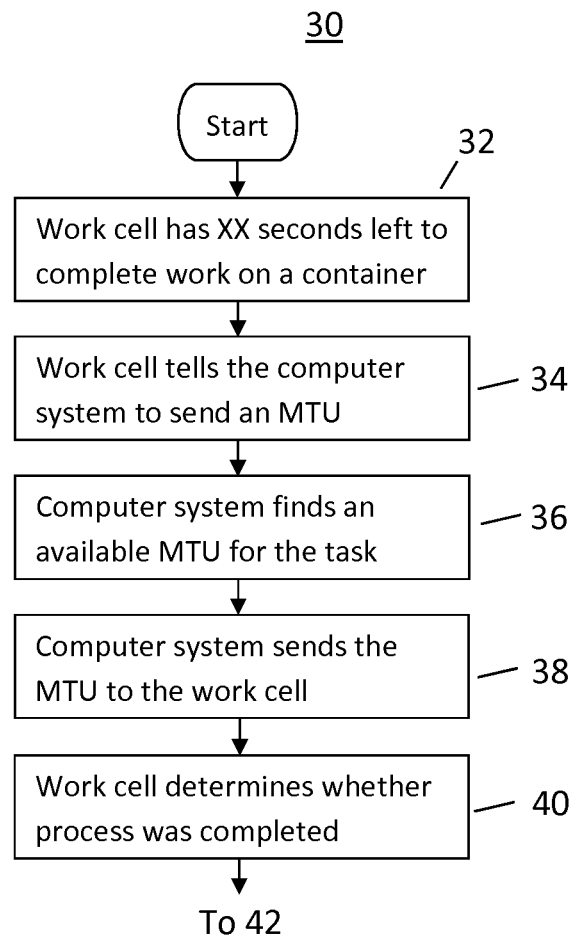
FIGS. 3A and 3B show a flow chart for the coordination between the computer system and the controlling devices and the movement of the MTUs shown in FIG. 1.
Figure 3B:
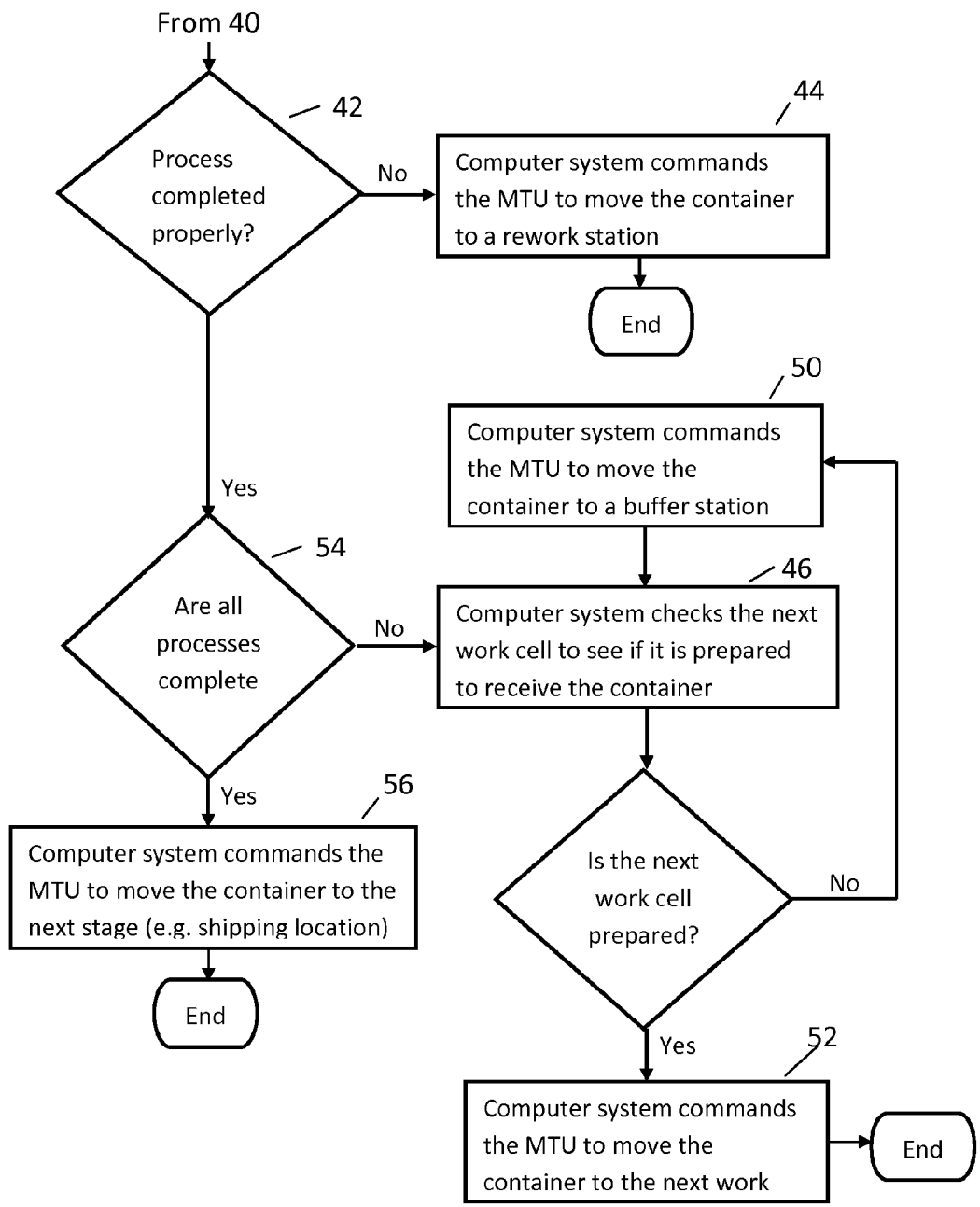

Referring now to FIGS. 3A and 3B, there is shown a flow chart 30 for the coordination between computer system 22 and controlling devices 12a, 14a, 16a, 18a and 20c for the movement of MTUs 20a, 20b in manufacturing environment 10.

As shown in block 32 when a work cell has a predetermined number of seconds left to complete work on the contents of a transportable container in the cell, the work cell controlling device at block 34 communicates with the computer system 22 and requests that a MTU 20a or 20b be sent to the cell. The number of seconds left in block 32 may be zero for some cases, such as when a process error occurs and the work should be stopped for the current workpiece. In response to the request, at block 36 the computer system 22 finds an available MTU that can meet the request. A MTU is "available" if it is not actively performing or assigned to a task. For example, a MTU's status can be changed to "available" after it has successfully performed its task, such as delivering a workpiece, bin, pallet, etc. to a work cell.

The computer system 22 has in its memory information to find an available MTU. This information includes the current status of each MTU, the road network and traffic rules for the movement of the MTUs. The road network defines lanes/paths for the MTUs to follow. The traffic rules define for example one-way directions for lanes/paths when necessary and which MTU has the right-of-way in the event of a possible collision.

Figure 4:
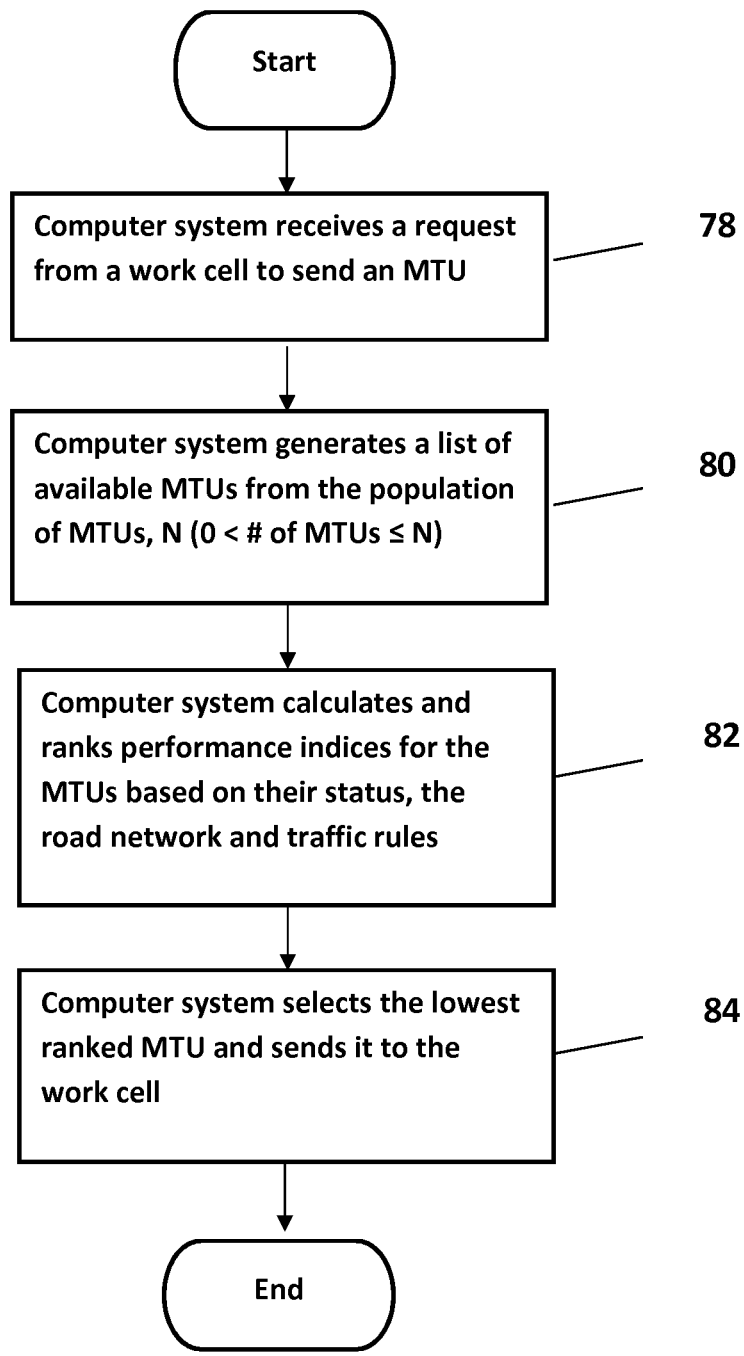
FIG. 4 shows a flowchart for one embodiment used by the computer system to coordinate the MTUs.

Referring to FIG. 4, there is shown a flowchart 76 for one embodiment used by the computer system 22 to find the MTU to be sent to the work cell. At block 78, the computer system 22 receives a request from a work cell 12, 14, 16 or 18 to send a MTU. At block 80, the computer system 22 in response to the request from the work cell creates a list of available MTUs from the MTU population, that is, the total number of MTUs, N. The computer system 22 creates the list based on the current state of each MTU. At block 82, the computer system 22 calculates and ranks the performance indices for the available MTUs based on several factors, such as the status of each MTU, the road network and the traffic rules. This could be as simple as ranking only those MTUs not carrying transportable containers and ranking them based on distance from the work cell. The closest MTU is given a rank of 1 and the farthest MTU is given the highest numerical rank. At block 84, the computer system selects the lowest ranked MTU (rank of 1) and sends that MTU to the work cell that requested the MTU.

Returning back to FIGS. 3A and 3B, at block 38, the available MTU 20*a* or 20*b* is sent to the work cell that requested the MTU. At block 40, the work cell that requested the MTU uses its controlling device to let the computer system 22 know if the work that was close to or at completion (see block 32) was properly completed. As is well known, the work cell may make this determination by many means, such as using a vision system or incorporate a testing system, such as for example go/no go gages on the work cell tooling, to determine if the work was properly completed.

Decision block 42 asks based on the information received from the work cell that requested the MTU 20*a* or 20*b*, if the work at that cell was properly completed. If the work was not properly completed, that is there is an error in the manufacturing process, then the computer system 22 at block 44 transmits a command to the controlling device 22*c* of the associated MTU 20*b* with the work to have that MTU move the transportable container with the improperly completed work to a rework station (e.g. a manual station 18 where a human properly completes the improperly completed work). Thus at the rework station the not properly completed work is properly completed. The flow for the improperly completed work that is properly completed at the rework station is the same as that described below for a Yes answer to decision 42. Alternatively, depending on the process error, the MTU could move the transportable container to a disposal area. The flow in FIG. 3B for the work cell that requested the MTU for moving the workpiece to a disposal area then ends for that workpiece.

If the work was properly completed, then the computer system 22 at decision block 54 determines if all of the processes are completed for the workpiece that is being worked on in the work flow. If the determination is that there are no more processes to be performed on the workpiece, then the computer system 22 at block 56 commands the associated MTU 20*b* to move the transportable container with the completed workpiece on it to the next stage in the work flow which may be a shipping location such as location 72 in FIG. 7 and the flow ends for that workpiece. The next stage in the work flow may also be a warehouse such as warehouse 68 in FIG. 7 where the completed workpiece is held in inventory so for example it can be used to fulfill orders when the work cells are shut down for maintenance.

If the computer system at decision block 54 determines that there are processes still to be performed on that workpiece, then the flow proceeds to block 46. At block 46 the computer system 22 checks the next work cell that is to receive the completed work to see if that cell is prepared to receive the transportable container with the properly completed work. The computer system 22 maintains continuously updated records of the status of the work cells 12, 14, 16 and 18 in manufacturing environment 10 and the relationship of the work cells to the work being performed by the work cells in environment 10.

At decision block 48, the computer system 22 determines if the next work cell 12 or 14 or 16 or 18 in the work flow is prepared to receive the properly completed work. If the computer system 22 determines by querying the controlling device of the next cell in the work flow that the next cell is not ready to receive that work, then the computer system 22 at block 50 commands the MTU controlling device 20*c* to have the associated MTU 20*b* move the transportable container with the properly completed work to a buffer station, 26 in FIG. 1, where the completed work is held until the next work cell in the work flow is ready to receive the work. The flow then returns to block 46.

If the computer system 22 determines that the next work cell in the work flow is prepared to receive the properly completed work, then the computer system at block 52 commands the associated MTU controlling device 20*c* to have the MTU 20*b* move the transportable container with the properly completed work to the next work cell in the work flow for that workpiece and the flow ends for that workpiece.

Figure 8:
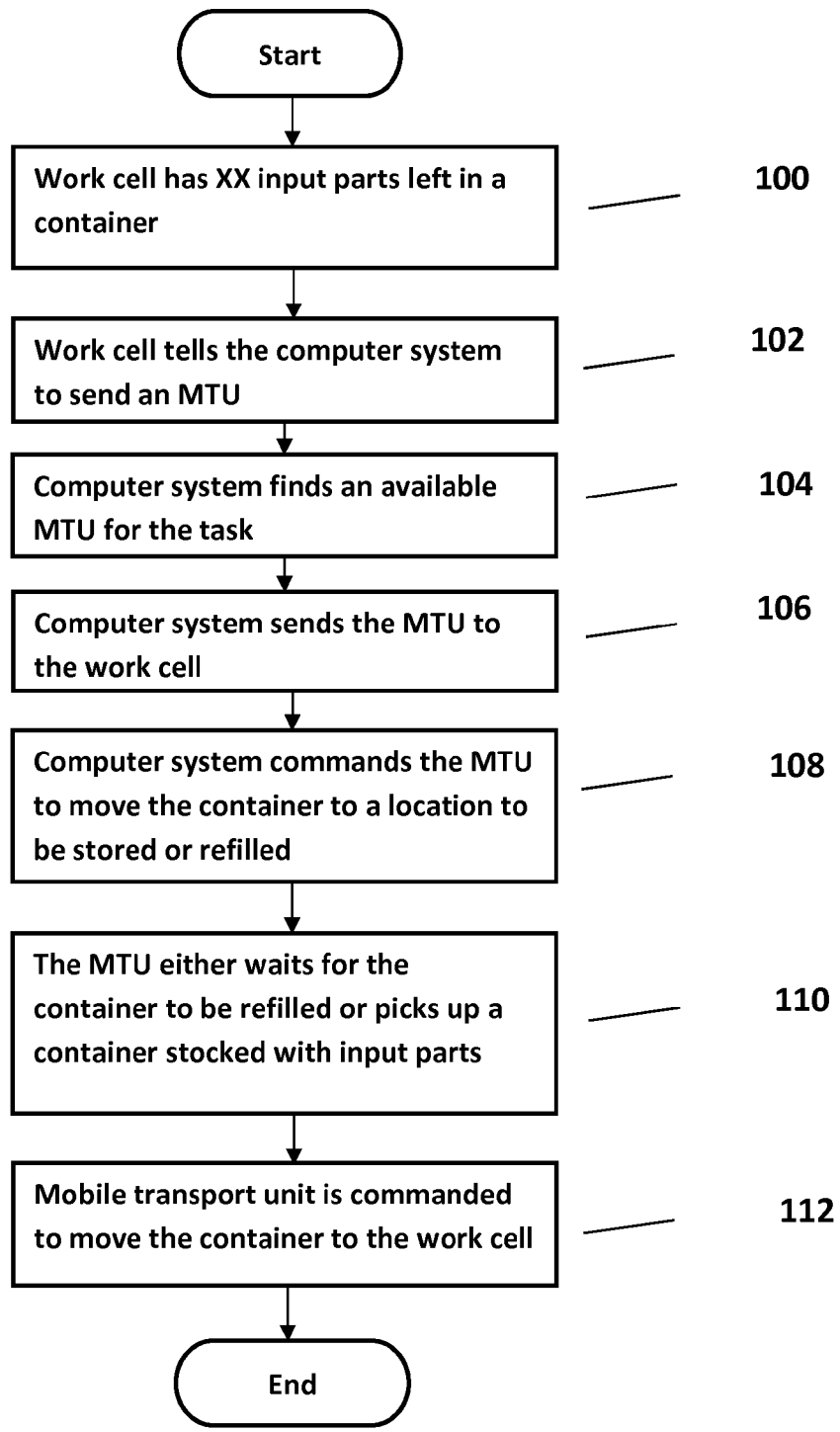
FIG. 8 shows a flowchart for the coordination of input workpiece delivery.

Referring to FIG. 8, there is shown a flow chart for the coordination of the delivery of input workpieces to work cells by MTUs. Input workpieces are workpieces that are added to a main workpiece or assembly (e.g. rivets, nuts or bolts). These workpieces are delivered on transportable containers, which may be in the form of tables, bins, trays, pallets, etc. As shown in block 100 when a work cell has a predetermined number of input workpieces left in a container, a request to computer system 22 is generated at block 102 to send a MTU to the cell. In response to the request, at block 104 the computer system 22 finds an available MTU that can meet the request and system 22 at block 106 sends that MTU to the cell. As shown in block 108, the MTU is commanded by computer system 22 to move the work cell container to a storage location or a location to be refilled with input workpieces. In block 110, the MTU either waits for the container to be refilled or picks up another container that is stocked with input workpieces. As shown in block 112, the MTU is commanded to move the container to the work cell.

Figure 7:
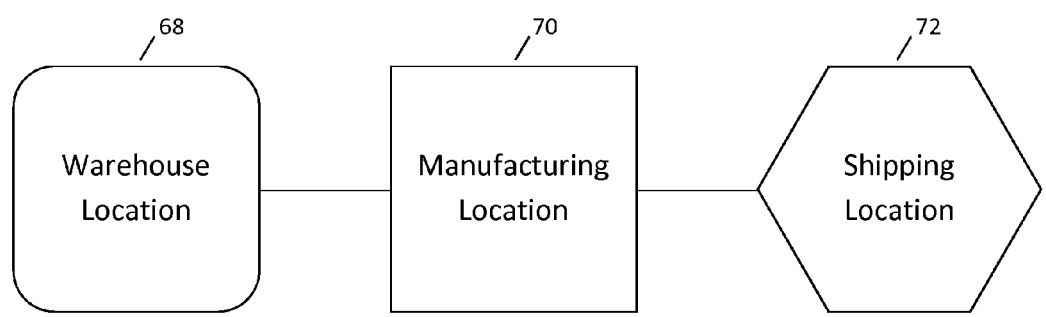
FIG. 7 shows a block diagram for the relationship between the warehouse, manufacturing and shipping locations.

Referring now to FIG. 7, there is a block diagram that shows the relationship between the warehouse location 68 where workpieces to be worked on and/or completed workpieces are stored, the manufacturing location 70 where the work cells are located and the shipping location 72 where completed work is packaged for shipment to customers. It should be appreciated that some facility configurations could have one or more of any of these types of locations, or have the shipping location replaced by a storage location.

It should be appreciated that populations of standardized equipment can be used in the described flexible production manufacturing environment. The standardized equipment includes, but is not limited to, robots, mobile transport units and transportable containers, and provides the highly flexible nature of this manufacturing environment. When there is a change in the process flow in the manufacturing environment, the major changes that will have to be made are updates to the planning software with little to no hardware changes. The updates to the software would include a change to the path planning to add or remove work cells as necessary. Hardware changes that may be required could include tool changes, which would be required regardless of the delivery method, or the addition or removal of mobile platforms and transportable containers. Therefore this use of standard equipment allows for quick change over from one production flow to another.

It should also be appreciated that:
the processes performed in the robot, hard automation and manual work cells could include cleaning, painting, coating or surface treatment;
when one of the work cells is to change the manufacturing process from the process which the cell is performing to another of the one or more manufacturing processes that the cell is capable of performing, the computer system transmits information to that work cell about the manufacturing process to be performed where the transmitted information may be changes to the software associated with the process of the cell. The change in the manufacturing process may require a change in the tooling used by the cell to perform the work and a change in the routing schedule for the MTUs;

the one or more manufacturing processes to be performed by the one or more work cells have distinct flows which allows for multiple workpieces to be simultaneously manufactured;

a manufacturing process flow can be one of the one or more work cells performing at least one manufacturing process on a workpiece and may also include adding another of the work cells to perform another manufacturing process on that workpiece after the one of the one or more work cells has performed the at least one manufacturing process on the workpiece. The adding of another work cell may require software changes to update the routing schedule for the MTUs, the updating of the software to add the task to be performed at the new work cell and also require tooling added to the new work cell; and a first manufacturing process flow that has two or more work cells each performing at least one manufacturing process on a workpiece can be changed to a second manufacturing process flow that requires less work cells with any needed associated changes made in the routing schedule for the MTUs.

It should further be appreciated that the described flexible production manufacturing environment:

makes it easy to split the production line to manufacture multiple, different workpieces;

allows, if one cell needs to be repaired, another cell to take over the work by moving the tool on the changer that performs or would perform the work in the cell to be repaired to the changer in the cell that takes over the performance of the work;

makes it easy to duplicate an entire manufacturing process flow so multiple instances of the process flow can be running in parallel to increase the production rate;

makes it easy for longer processes, to add parallel processes to keep up the production rate;

allows cells to work at near 100% usage since optimally there is no wait for transport time;

allows workpieces that require rework to be automatically rerouted to a manual station without traveling through the other stations thus keeping work cell utilization close to 100%;

allows workpiece buffer stations to be anywhere in the manufacturing environment without taking up line space as they would with a conveyor and the buffer stations can be dynamically allocated as needed based on prior knowledge of the available open space;

makes it easy to tune the system over time since no fixed conveyor rework is required; and allows a schedule and routing for delivering a MTU to at least one of the one or more work cells to be preplanned and updated when a process event has occurred, where that event can for example be an error, an order change, a change in the number of MTUs used, a process change request or a wait request.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system of manufacturing comprising:
   one or more work cells, where each of said cells performs one or more manufacturing processes on an associated one of one or more workpieces;
   one or more mobile transport units ("MTUs") to deliver transportable containers containing said workpieces to and from said work cells, said one or more mobile transport units delivering said containers to said work cells independent of a fixed in place path between said one or more work cells and in a manner such that said workpieces are localized in said work cells; and
   a computer system having therein status information for each of said one or more MTUs and using said status information to control each of said one or more MTUs to deliver said transportable containers to and from said one or more work cells;
   wherein when a determination is made that work performed at one of said one or more work cells on said associated workpiece is in error, said computer system commands said associated one of said one or more MTUs to deliver said transportable container with said workpiece on which said work in error was performed to one of a rework station or a disposal area.

2. The system of claim 1 wherein there is a known process flow that is used by said computer system to perform MTU selection.

3. The system of claim 2 wherein said computing system performs production scheduling and workpiece routing.

4. The system of claim 1 wherein at least one of said one or more work cells comprises machinery capable of performing said one or more manufacturing processes.

5. The system of claim 4 wherein at least one of said one or more work cells comprises one or more industrial robot arms.

6. The system of claim 5 wherein one or more of said one or more industrial robot arms comprises a tool changer that allows said tool adapted to perform said specific task to be changed for another tool adapted to perform another specific task when each of said one or more robots have to perform said another specific task.

7. The system of claim 1 wherein said computer system has therein a road network and traffic rules for controlling movement of each of said one or more MTUs.

8. The system of claim 7 wherein said road network defines lanes or paths for said MTUs to follow and said traffic rules define one way directions for lanes or paths when necessary and which of said one or more MTUs has the right of way in the event of a possible collision.

9. The system of claim 1 wherein at least one of said one or more work cells locates said transportable containers within said at least one of said one or more work cells.

10. The system of claim 1 wherein each of said one or more work cells that is performing work on said workpieces in said transportable container delivered to said work performing work cell requests at a predetermined time based on how much time is left to complete said work that one of said one or more MTUs on demand be sent to said requesting work cell.

11. The system of claim 1 wherein said manufacturing processes performed by each of said one or more work cells and the flow of MTUs are controlled in accordance with an associated production schedule.

12. The system of claim 11 wherein said flow of MTUs can change when a process event has occurred.

13. The system of claim 1 wherein said one or more manufacturing processes at said one or more work cells can be changed so that said work cell performs a different one of said one or more manufacturing processes.

14. The system of claim 13 wherein said computer system transmits information to said work cell about said different one of said one or more manufacturing processes to be performed.

15. The system of claim 1 wherein more than one distinct process flows are performed simultaneously, and one or more of said work cells are used in more than one of the distinct process flows.

16. The system of claim 1 wherein one or more of said work cells are added to add one or more of said processes to the process flow or are removed to remove one or more of said processes from the process flow by changing the traffic flow of said MTUs.

17. The system of claim 1 wherein one or more other work cells are added to a set of said one or more work cells to thereby increase the number of work cells in said set of said one or more work cells.

18. The system of claim 1 wherein two or more of said one or more work cells perform the same one or more processes.

19. The system of claim 1 wherein there are one or more buffer stations for holding said transportable containers until said work cell is prepared to receive said transportable container and the one or more buffer stations' locations are dynamically allocated.

20. The system of claim 1 wherein one or more of said one or more work cells comprises one or more container stations for receiving said transportable containers delivered to work cell.

21. The system of claim 20 wherein one or more of said container stations are at predetermined locations within said work cell.

22. The system of claim 20 wherein one or more of said container stations are docking stations for localizing said transportable containers in said work cell.

23. The system of claim 1 wherein more than one of said MTUs can be used for transport of more than one type of said transportable containers.

24. The system of claim 1 wherein said one or more manufacturing processes performed by each of said work cells are performed in a flow that can be dynamically changed.

25. The system of claim 24 wherein said flow for said one or more manufacturing processes is changed only by software.

26. The system of claim 24 wherein said flow for said one or more manufacturing processes is changed due to events relating to said manufacturing processes.

27. The system of claim 24 wherein said flow for said one or more manufacturing processes is changed to add or remove one or more of said work cells.

28. The system of claim 1 wherein when said error in a workpiece is corrected at said rework station and said computer system commands said associated one of said one or more MTUs to deliver said transportable containers with said corrected workpiece to one of: a location for receiving completed workpieces or when it is determined that one or; to a work cell that can perform said one or more further processes when it is determined that one or more further processes to be performed on said workpieces more further processes are still to be performed on said workpiece to a work cell that can perform said one or more further processes.

* * * * *